United States Patent Office 3,522,044
Patented July 28, 1970

3,522,044

NEGATIVE-WORKING REPRODUCTION MATERIAL

Ernst-August Hackmann, Wiesbaden-Biebrich, Germany, assignor to Kalle Aktiengesellschaft, Wiesbaden-Biebrich, Germany No Drawing. Filed Dec. 9, 1965, Ser. No. 512,785
Claims priority, application Germany, Dec. 10, 1964, K 54,764; Jan. 30, 1965, K 55,149; Sept. 1, 1965, K 57,011
Int. Cl. G03c *1/72*
U.S. Cl. 96—36 14 Claims

ABSTRACT OF THE DISCLOSURE

Light sensitive negative-working reproduction material having improved light sensitivity in the visible spectrum is prepared by combining a halogen hydrocarbon source of free radicals with an N-vinylcarbazole and an aldehyde/heterocyclic azole condensation product. Also disclosed is the method of producing a printing medium from said light sensitive material.

The present invention relates to new, negative-working reproduction materials of high light-sensitivity.

Reproduction materials have been described which utilize the light-initiated reaction between N-vinylcarbazole and certain halogen hydrocarbons. Materials consisting essentially of a combination of these compounds are exposed to light imagewise under an original and a latent image is formed which can be made visible by heating. These materials are light-sensitive mainly in the ultraviolet region and are therefore of little suitability for enlargement of microfilm, since, in enlarging equipment, light sources are generally used which have only a low proportion of ultraviolet.

It is an object of the present invention to produce a reproduction material of improved light-sensitivity which yields better image quality and by means of which a visible image may be obtained when exposure to light is effected.

Another object of the invention is a reproduction material of higher light sensitivity which possesses suffient sensitivity in the visible region of the spectrum to be capable of being processed in conventional enlarging equipment.

A further object of the invention is a reproduction material of improved sensitivity which may be readily fixed after image formation. Yet another object is a reproduction material which provides a simple means for producing high quality printing plates and the like. Other objects of the invention will become apparent as this description proceeds.

The material of the present invention may be generally described as a light-sensitive material comprising a suitable support, for example, paper, metal or plastic films and a light sensitive coating thereon, said coating comprising at least one N-vinyl carbazole, at least one condensation product of an aldehyde with one or more azoles, that is, organic nitrogen-containing, heterocyclic, quasi-aromatic 5-membered ring compounds (which may be substituted and form a component of a condensed ring system), and at least one organic halogen compound which splits off halogen when exposed to light. The light-sensitive composition may additionally include a ferrocene sensitizer, aromatic or heterocyclic aldehydes, and various binder materials for the improvement of coatability, texture, etc.

The addition of aldehydes to the composition has been found to result on the one hand in increased dye formation and on the other hand in increase of contrast between exposed and unexposed areas by reducing the degree of fogging in the unexposed areas. Materials of this type which are particularly useful are 3,4-methylenedihydroxy benzaldehyde, and indole-3-aldehyde.

Halogen hydrocarbons useful in the coating composition of the present invention include those which split off halogen when exposed to light. In particular, halogen hydrocarbons of the general formula:

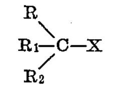

may be used, wherein X may stand for chlorine, bromine and iodine, and R, $R_1$ and $R_2$ may be the same or different and stand for chlorine, bromine, iodine, hydrogen, and alkyl (which may be optionally substituted by chlorine, bromine or iodine), aryl, aralkyl, alkenyl or a heterocyclic group.

In addition, polyhalogenated hetercyclic 5-membered rings, such as pyrroletetraiodide, tetraiodothiophene, and tetrabromopyrrole, and halogenated plastics, for example, chlorinated rubber, may also be used.

As individual representatives of the halogen hydrocarbons to be used according to the invention, the following are named: pentabromoethane, hexachloroethane, ω,ω,ω-tribromoacetophenone, benzotrichloride, cyanuric chloride, iodoform, bromoform and hexachlorocyclohexane.

Particularly good results are yielded by: tetrabromomethane, 4-bromo-ω,ω,ω-tribromoacetophenone, 2,4 - dimethyl-ω,ω,ω - tribromoacetophenone and 3-nitro-ω,ω,ω-tribromoacetophenone.

By condensation products of a nitrogen-containing, heterocyclic compound with a quasi-aromatic five-membered ring and aldehydes are meant those which, for example from 2 moles of indole or a mixture of different indoles (which may be substituted at the indole nucleus as well as at the aromatic nucleus) and 1 mole of aldehyde, are formed according to the following equation:

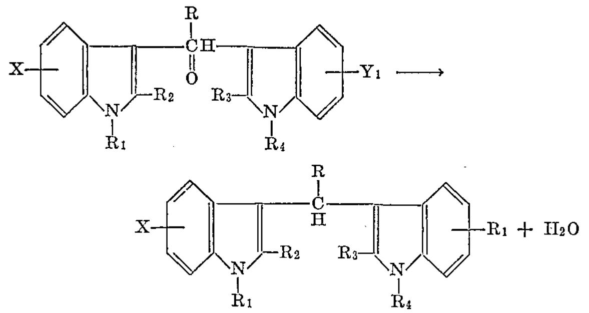

The reaction takes place in conventional manner in alcoholic solution in the presence of acid catalysts, e.g. mineral acids or zinc chloride (Lit. E. Fischer, Liebigs Ann. Chem. 242, page 372, 1887). As starting material, one substituted indole or a mixture of substituted indoles may be used. In the case of the latter, besides symmetrical condensation products, unsymmetrical condensation products are also formed, which is indicated in the above formulae by appropriate numbering of the substituents.

Besides indole itself, substituted indoles may also be used. In the above general formula, $R_1$, $R_2$, $R_3$ and $R_4$ may be the same or different and stand for hydrogen, alkyl, alkenyl, aralkyl, alkaryl and aryl. The benzene nucleus may bear one or several, preferably one or two, substituents X, $X_1$, which may be the same or different, X and $X_1$ standing for OH, O-alkyl, halogen, carboxyl, carboxyalkyl.

In the above general aldehyde formula, R may stand for hydrogen, an alkyl, aryl, substituted aryl, and alkenyl radical, an aralkyl radical and a heterocyclic radical. As individual representatives of this group, the following examples are mentioned: benzaldehyde, 4-dimethylaminobenzaldehyde, 3,4-dichlorobenzaldehyde, 4-chlorobenzaldehyde, 3-nitrobenzaldehyde, 3,4-methylene-dihydroxybenzaldehyde, 4-hydroxybenzaldehyde, cinnamaldehyde, 4-aminocinnamaldehyde, indole-3-aldehyde, phenylpropionaldehyde, formaldehyde, acetaldehyde, propionaldehyde and butyraldehyde.

Instead of the condensation products from indoles and aldehydes whose general formulae are given above, the compounds which can be prepared in analogous manner by reacting pyrroles, pyrazoles, imidazoles, 1,2-substituted pyrazolones, triazoles and tetrazoles with the same aldehydes may also be used for building up the light-sensitive coating according to the invention, in which case, too, mixtures may be used as starting materials for the preparation of the condensation products.

By pyrroles are meant, besides pyrrole itself, those which bear up to four substituents, an α-position to the nitrogen always remaining free. The pyrroles which can be used according to the invention are described by the following general formula:

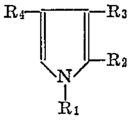

wherein the substituents $R_1$, $R_2$, $R_3$ and $R_4$ may be the same or different and have the same meaning as the radicals $R_1$, $R_2$, $R_3$ and $R_4$ in the case of the indoles. These pyrroles may be reacted with aldehydes in manner analogous to that in which the indoles are reacted. Also eligible are pyrazoles and imidazoles, and substitution products thereof with up to three substituents, which conform to the following general formulae:

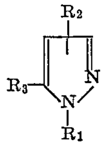 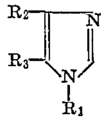

wherein $R_1$, $R_2$ and $R_3$ may be the same or different and may have the same meaning as in the case of the indoles above. In addition, $R_2$ and $R_3$ may form a condensed ring, preferably an aromatic ring which, as stated above in the case of the indoles, may bear substituents X or $X_1$.

The preparation of the condensation products is effected in the manner stated above.

The condensation products of pyrazolones to be used according to the invention are derived from the following general formula:

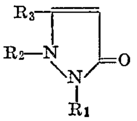

wherein $R_1$, $R_2$ and $R_3$ may be the same or different and have the meaning mentioned above in the case of indole. In order to prepare the condensation products, the method stated by L. Knorr, Liebigs Ann. Chem. 238, page 214 (1887), was followed. The condensation products of the triazole or of substituted triazoles to be used according to the invention are derived from the following general formula:

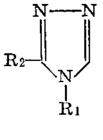

$R_1$ and $R_2$ may be the same or different and have the meaning explained above in the case of the condensation products of indole. The preparation of the condensation products is effected in the same manner as in the case of the indoles.

The condensation products of the tetrazole are based finally on tetrazoles of the general formula:

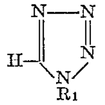

wherein $R_1$ may have the meaning already explained above. Tetrazoles also can be reacted with aldehydes in the same manner as the indoles.

In the following are stated the general formulae of some typical condensation products, e.g.

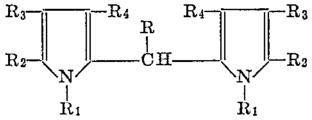
from pyrrole + aldehyde

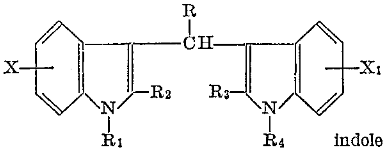
indole + aldehyde

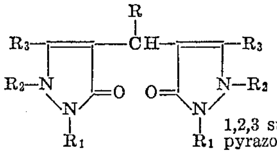
1,2,3 substd. pyrazolone + aldehyde

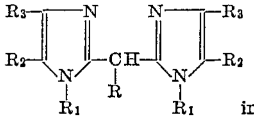
imidazole + aldehyde

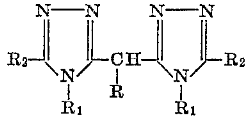
triazole + aldehyde

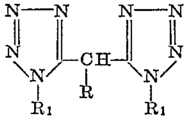
tetrazole + aldehyde

The light-sensitivity of materials including the compounds noted above can be considerably increased in the ultra-violet region as well as in the visible region of the spectrum by the addition of N-vinyl carbazoles. In addition to N-vinyl carbazole itself, other N-vinyl carbazoles may be employed with excellent results, for example, 3,6-dimethyl-N-vinyl carbazole. Additional visible light sensitivity has been obtained by the addition of ferrocene, diacetyl-ferrocene, dipropionyl ferrocene, dibenzoyl ferrocene, bis-(3-nitrobenzoyl)-ferrocene, bis-(4-dimethylaminobenzoyl)-ferrocene and ferrocene dicarboxylic acid. The use of ferrocene itself is preferred.

In order to prepare the reproduction material according to the invention, a solution is prepared with a suitable solvent and includes one or more of the above-mentioned condensation products, one or more halogen hydrocarbons, at least one N-vinyl carbazole, optionally one or more aromatic or heterocyclic aldehydes, and optionally one or more ferrocene compounds. If desired, a binder material as will be later described may also be included. An effective amount of the solution is applied by any of a number of various coating methods, the preference of the manufacturer being determinative, to a suitable support and the solvent is removed by evaporation means.

A suitable support for the coating of the present invention may be selected from any materials including wood, glass, plastic film, metal foil, textiles, and in particular cellulose derivatives, such as for example cellulose triacetate and paper.

To achieve better shelf life of the unexposed reproduction materials, one of the active components of the light-sensitive coating, for example the halogen hydrocarbon, may be added shortly before exposure. Pre-exposure application might be practically accomplished by exposure to the hydrocarbon in gaseous form.

Compared with known materials, the light-sensitive materials according to the invention have considerably higher light sensitivity in the visible as well as in the ultraviolet region of the spectrum. The light sensitivity in the visible range of the spectrum renders possible processing in conventional enlarging devices equipped with tungsten lamps.

Light-sensitive material according to the present invention will produce an image immediately upon exposure to light and the image may be intensified by subsequent heating. Heat-intensification of the image areas is particularly effective when ferrocene has been added. When readily volatile halogen compounds are used, this subsequent heating step for intensifying the image can serve simultaneously as a means of fixing and rendering the material light-insensitive. Ferrocene sensitizers as well as the halogen hydrocarbon may be removed during this heating step.

The fixation of reproduction materials according to the invention which contain non-volatile halogen compounds can be achieved by washing the exposed sheet with a suitable non-polar organic solvent, for example, petroleum ether, ligroin, or mineral spirit, if desired after the image intensification step has been accomplished.

As generally noted above, binder materials may be employed in the sensitizing composition to give suitable adherence of coatings, such as where the selected support is smooth-surfaced material, for example plastic film, glass, hard papers and the like. Suitable binder materials may include synthetic resins, natural resins and waxes, such as polystyrene, carboxy methyl cellulose, colophony, shellac, beeswax or Carnauba wax.

A particularly advantageous fixing method is by using binder materials which are soluble in water and aqueous alkaline solutions as well as inorganic solvents. Such preferred binder materials include solid higher polyglycols, polyvinyl alcohol, poly-N-vinyl pyrrolidone, acid phenol resins, and polyacrylic amides. With the exception of the phenol resins, these resins may be removed from the layer by means of water. The phenol resins must be washed away with an aqueous alkaline solution. Although not necessary, such aqueous alkaline solutions may be used to wash a material including the other binders. When polyacrylic amides are used, it should be noted that these materials become water-insoluble under the action of higher temperatures.

Many suitable organic solvents for preparing the coating solution are available and particularly useful are chlorinated hydrocarbons and acetone, since the light-sensitive components of the layer dissolve easily in the solvents. One or more binder materials may be contained in a layer and the contents of the binders in the layer may vary within wide limits. The amount of binders used will depend to some degree upon the type of binder material employed. Some binders, such as poly-N-vinylpyrrolidone, may be present in the layer in quantities ranging from 2 to 20% by weight based on the weight of the layer. Other binders may be added at even wider ranges or within widely varying ranges. Preparation of the coating from a solution makes possible a molecular dispersion of the light-sensitive components with the result that very high light-sensitivity of the layer is achieved. It is noteworthy that only a minor decrease of the light-sensitivity is caused by the addition of binder materials. This disadvantage is more than compensated by the advantage that the material can be easily fixed with water.

It is often advantageous to add wetting agents to the layers in order to facilitate the removal of the unexposed layer parts. Quantities ranging from 0.1 to 1% by weight, based upon the weight of the whole layer, are sufficient for this purpose. Cationic as well as anionic wetting agents may be used. Good results are obtained with commercial wetting agents such as Triton X100 (isooctyl phenyl polyethoxy ethanol).

Depending on the kind of vinyl compound used, an appropriate quantity of a polymerization inhibiter may be added to the solution prepared for the production of the light-sensitive layer in order that a premature polymerization of the vinyl compound is avoided. The inhibiting effect of the substance added must not, however, be such that polymerization during exposure is prevented. The amount of inhibiter may vary within wide limits. Generally, it will be sufficient to add 0.0001% to 3% by weight of inhibiter, preferably 0.001% to 1% by weight, based on the weight of the layer.

The following compounds have proved suitable as polymerization inhibiters: aromatic hydroxyl compounds, such as phenol, hydroquinone, pyrocatechol, pyrogallol, dihydroresorcinol, and amino phenols, such as o-, p-amino phenol and p-dimethyl aminophenol.

Fixing of the exposed materials containing a binder that is soluble in water or aqueous alkaline solutions and organic solvents is performed by contacting such materials with any one of these solvents, for instance by immersion of by wiping over the layer with a wet sponge. A preferred fixing method includes the use of a device provided with rollers whereby the layer side of the exposed reproduction material is contacted by a roller carrying a thin layer of water or other appropriate solvent material such as an aqueous alkaline solution.

During the fixing process it is not only the binder in the unexposed areas which is removed, but also the light-sensitive component distributed in these areas. The exposed areas are not attacked by water or other washing medium, because in these areas the monomeric-N-vinylcarbazole has turned into poly-N-vinylcarbazole. The polymer layer thus formed contains inclusions of the dyestuffs formed during exposure along with residual unreacted halogen hydrocarbons and may, in some cases, also contain residual unpolymerized mono-N-vinylcarbazole. It is assumed that the binder is in part polymerized in the polymer, in part surrounded by it. In any case, no binder is removed from the exposed areas by washing. These areas are no longer hydrophilic, but hydrophobic. The polymeric compound formed by the action of light is so resistant to abrasion that the image areas may be used for printing without further treatment.

Reproduction materials produced according to the present invention are particularly suitable for use in preparing plates for printing. They are preferably used as offset printing plates; however, etched plates may also be produced with the materials described, since the polymeric compounds are resistant to etching. If the material is used for offset printing, the support upon which the coating is applied should have a hydrophilic surface since as stated above, the polymeric compound produced by the action of light is hydrophobic and thus accepts greasy ink. The exposed areas of a coated sheet are the printing areas, while the unexposed, washed-out areas accept water and are non-printing. Suitable supports in the preparation of offset plates can be any sheet-like materials normally used for this purpose, for example pre-coated papers, plastic films, and aluminum foils.

If etched printing plates are to be produced from the reproduction material according to the invention, zinc or magnesium plates are preferred as supports. The common bi- or tri-metal plates or copper plates, or plates of copper/plastic laminate may also be used, however.

If directly readable copies are to be produced from the reproduction material according to the invention, the use of paper supports is recommended. The requirement to be met by the paper is that at least its layer side should be resistant to solvents from which the layer is to be applied. Further, it must be waterproof, at least on its layer side, because the unexposed areas of the layer will be removed after exposure for the most part by washing with water or aqueous solution. A certain degree of stiffness to facilitate processing by roller application is also desirable. It has been found useful in the preparation of a suitable support medium to provide one or more base coatings with materials such as polyvinyl chloride, polyacrylic acid and polymethacrylic esters, polystyrene, polyvinylidene chloride, phthalate and maleinate resins, and their copolymers. These materials are sufficiently resistant to water to give suitable protection to paper or other support materials which might be affected thereby.

In some instances it may be desirable to over-coat a support having a waterproof precoat layer with a resin that is readily soluble in water. When the exposed material is washed with water or aqueous solution during the fixing step, the layer which has not hardened by polymerization due to exposure to light is removed from the unexposed areas. In this manner slightly reacted background discolorations may readily be removed to give clear, clean, and high contrast image reproductions. Poly-N-vinyl pyrrolidone is a material particularly suited to this purpose.

In some cases, it is desirable to produce transparent copies, for example when they are to be used for the preparation of further copies by contact exposure. For this purpose, a transparent support should be used and may include glass or any similar transparent medium. Films of cellulose acetate which may be superficially saponified are preferred. If dimensionally stable transparent copies are required, polyethylene terephthalate films are preferably used.

Processing of the reproduction material according to the invention is simple and can be easily understood from what has been described above. The reproduction material may be exposed to light by contact, direct, or reflex processes. Suitable light sources for exposure may be conventional mixed light or ultraviolet radiators, or the ordinary incandescent bulb. Also, by means of projection equipment enlargements may readily be made on the reproduction material from microfilm originals.

Heating of the reproduction material after exposure is not necessary, as previously noted; however, it may be of advantage in some cases, in particular when ferrocene was added as sensitizer. Normally, exposure is immediately followed by a fixing process. Fixing usually takes place in the dark or at least in a weakly-lighted area under the incidence of light of the longest possible wave length. Fixation normally takes about 30 seconds and the final imaged material may be dried by air at normal temperatures or by means of a hot air blower.

Compared with known materials, the reproduction material according to the present invention has the advantage of substantially higher light sensitivity, particularly in the visible range of the spectrum. The image becomes visible immediately upon exposure. A further advantage of the material according to the invention is the aqueous fixation when water-soluble binders are used. Moreover, the light-stability of copies prepared with the material according to the invention is significantly increased over that previously obtainable with prior copy materials.

The invention will be more specifically illustrated by the following examples:

EXAMPLE 1

A base paper commonly used in photocopying processes was soaked with a solution of 0.1 g. of the condensation product form the reaction between 1-methyl-2-phenylindole and cinnamaldehyde, 1.0 g. of tetrabromomethane and 1.0 g. of N-vinyl carbazole in 10 ml. of acetone, and the solvent evaporated. A re-enlargement of a silver-film negative in the scale 1:10 was made on the thus prepared reproduction material with a 500-watt projector. The exposure time was 60 seconds. A strong, green image on a colorless background was obtained. The image was fixed with a wash with petroleum ether.

EXAMPLE 2

After coating the same base paper with a solution of Example 1 containing additionally 0.1 g. of 3,4-methylenedihydroxy benzaldehyde, and evaporation of the solvent, under otherwise equal conditions, a distinctly legible green image on a colorless background was obtained after only 30 seconds exposure time. Fixing was accomplished similarly with a petroleum ether wash.

EXAMPLE 3

A paper prepared and exposed according to Example 2 was fixed at 100° C. in a drying cabinet rather than with a petroleum ether wash. A distinctly legible, dark green image on a colorless background was obtained which exhibited equal permanency.

EXAMPLE 4

A transparent paper was soaked with a solution of 0.1 g. of the condensation product from 1-phenyl-2,3-dimethyl-pyrazolone-5 and dimethylaminobenzaldehyde, 1.0 g. of p-nitro-$\omega,\omega,\omega$-tribromoacetophenone, and 1.0 g. of N-vinyl carbazole in 10 ml. of acetone. After evaporation of the solvent, exposure was effected under a negative original for 30 seconds with a 160-watt mixed-light lamp. A distinct, grey-red image on a colorless background was obtained. Fixation was accomplished with a petroleum ether wash. The material may be used for the production of further copies, e.g. on photocopying paper.

EXAMPLE 5

A transparent paper was coated with a solution according to Example 4 which contained an additional 0.1 g. of dimethylaminobenzaldehyde. Under the same exposure conditions as described in Example 4, a distinctly strengthened image was obtained. The material may be used for the production of further copies, e.g. on photocopying paper.

EXAMPLE 6

A light-sensitive material prepared by soaking a base paper of the kind commonly used in photocopying processes with a solution of 0.1 g. of the condensation product from 2-methylindole and benzaldehyde, 0.1 g. of ferrocene, 1.0 g. of tetrabromomethane and 1.0 g. of N-vinylcarbazole in 10 ml. of acetone and evaporation of the solvent was exposed for ten seconds with a 500-watt projector in order to prepare a re-enlargement of a silver-film negative in the scale 1:10. A clearly legible brown image was obtained. The image was fixed by heating at 100° C. in a drying cabinet for two minutes during which time a distinct strengthening of the image occurred. The brown image showed a background of pale reddish color.

EXAMPLE 7

A paper prepared with a solution according to Example 6 containing additionally 0.1 g. of methylenedihydroxybenzaldehyde was exposed and processed identically as the paper in Example 6. A clearly legible, brown image on a colorless background was obtained.

EXAMPLE 8

A light sensitive material prepared by soaking a base paper of the kind commonly used in photocopying processes with a solution of 0.1 g. of the condensation product from 1-phenyl-2,3-dimethylpyrazolone-5 and dimethylaminobenzaldehyde, 0.1 g. of ferrocene, 1.0 g. of tetrabromomethane and 1.5 g. of N-vinylcarbazole in 10 ml. of acetone, and evaporation of the solvent, was exposed imagewise for 20 seconds and fixed under the conditions stated in Example 6. A permanent red-brown image on a colorless background was obtained.

EXAMPLE 9

A solvent-resistant paper was coated with a solution of 0.1 g. of the condensation product from 1,2-dimethylindole and benzaldehyde, 1.0 g. of tetrabromomethane, and 1.0 g. of N-vinylcarbazole in 10 ml. of a 3% solution of polystyrene in acetone. After evaporation of the solvent a 10× enlargement of a silver-film negative was produced on this material with an exposure time of 60 seconds. A distinct red image was obtained on an almost colorless background. The image was fixed with a wash with petroleum ether. The same result was obtained when the polystyrene was replaced either by a 28:72 copolymer of vinyl acetate and ethylene or by polyethylene glycol.

EXAMPLE 10

A baryta paper was coated with a solution of 0.5 g. of poly-N-vinylpyrrolidone, 1.0 g. of N-vinylcarbazole, 1.0 g. of tetrobromomethane, 0.1 g. ferrocene and 0.1 g. of the condensation product from 2-methylindole and benzaldehyde in 10 ml. of acetone and dried. The material was exposed under a master to the light of a 500-watt mixed light lamp at a distance of 35 cm. The exposure time was fifteen seconds. A strong red image on a colorless background was obtained. The image was fixed by means of a wash with water, the light-sensitive layer in the non-light-struck areas being removed. Equally good results were obtained when the condensation products of the following compounds were used in place of the 2-methylindole/benzaldehyde condensation product: 1,2-dimethylindole and benzaldehyde; 2-phenylindole and benzaldehyde; 1-methyl-2-phenyl-indole and p-dimethylaminobenzaldehyde; 1 - phenyl-2,3-dimethyl-pyrazolone-5 and dimethylamino-benzaldehyde. Red to brown images are obtained.

EXAMPLE 11

A paper printing foil, that is a solvent-resistant paper support having a hydrophilic surface, was coated with a solution of 0.1 g. of the condensation product from 2-methyl-indole and benzaldehyde, 0.05 g. of poly-N-vinylpyrrolidone, 1 g. of 4-nitro-$\omega,\omega,\omega$-tribromoacetophenone, 1.0 g. of N-vinylcarbazole, and 0.1 g. ferrocene in 10 ml. of acetone. The coating was dried by evaporation of the solvent. The reproduction material thus produced was exposed for fifteen seconds under an original to a 500-watt mixed light lamp and then washed with a dilute sodium metasilicate solution. The areas bared by the aqueous alkaline wash repel printing ink, whereas the light-struck areas are not washed away and readily accept greasy ink. A printing plate prepared in this manner may be used for printing in an offset printing machine.

EXAMPLE 12

A 3.0% solution of phenolaldehyde resin is acetone was whirl-coated onto a support of brushed aluminum and dried. Subsequently a solution of 0.2 g. of a condensation product from 2-methylindole and benzaldehyde, 2.0 g. of N-vinylcarbazole, and 2.0 g. of tetrabromomethane in 10 ml. of acetone was applied by whirl-coating and dried. The material was exposed for 60 seconds under a master to a 500-watt mixed light lamp at a distance of 35 cm. The material thus exposed was washed with a 20% sodium metasilicate solution. The non-exposed areas of the plate thereafter repelled printing ink, whereas the light-exposed areas accepted ink. A printing plate prepared in this manner may be used for printing on an offset machine.

EXAMPLE 13

The procedure described in Example 12 is repeated using, however, a zinc plate as the support. After coating, exposure and wash, the plate is etched for ten minutes in a 6% solution of nitric acid. By this etching process, the zinc is dissolved away in the non-light exposed areas so that a negative relief image of the master is produced. A magnesium plate may also be used as the support with identical results.

EXAMPLE 14

A light-sensitive material prepared by soaking a base paper of the kind commonly used in photocopying processes with a solution of 0.1 g. of the condensation product from 2-methylindole and p-chlorobenzaldehyde, 0.1 g. of ferrocene, 1.0 g. of carbon tetrabromide and 1.0 g. of N-vinylcarbazole in 10 ml. of acetone, was exposed for 5 seconds, and fixed, under the same conditions as described in Example 6. A clearly legible, red-brown image on an almost colorless background was obtained.

EXAMPLE 15

A light-sensitive material prepared by soaking a base paper of the kind commonly used in photocopying processes with a solution of 0.1 g. of the condensation product from 2-methylindole and 3,4-dichlorobenzaldehyde, 0.1 g. of ferrocene, 1.0 g. of carbon tetrabromide and 1.0 g. of N-vinylcarbazole in 10 ml. of acetone was exposed imagewise for 10 seconds, and fixed, in the manner stated in Example 6. A dark-brown image on a colorless background was obtained.

EXAMPLE 16

A baryta paper which had been precoated with "Mowiol N 70–98" (a polyvinyl alcohol supplied by Farbwerke Hoechst A.G.) is coated with the solution described in Example 10 and then dried. The reproduction material thus produced is exposed for 15 seconds under a master to a 500 watt mixed light lamp at a distance of 35 cm. Fixation is effected with water. Red images on a colorless background are obtained. Equally good results are obtained by using the condensation product from cinnamic aldehyde and 1-methyl-2-phenyl indole. Green images are produced.

Equally good results are also obtained when the tetrabromomethane used above is replaced by pentabromoethane, 3,5-dimethyl-$\omega,\omega,\omega$-tribromo acetophenone, or 4-nitro-$\omega,\omega,\omega$-tribromoacetophenone.

EXAMPLE 17

A baryta paper is coated with a solution of 0.5 g. of "Luviskol Va 64" (a poly-N-vinyl pyrrolidone supplied by BASF), 1 g. of N-vinyl carbazole, 0.1 g. of the condensation product from 2-methyl indole and benzaldehyde, and 0.1 g. of dimethyl amino benzaldehyde in 10 ml. of acetone, and dried. Before exposure, the coated paper is suspended for 45 seconds in a container containing excess tetrabromomethane at a temperature of 60° C.

A ten times enlargement is produced from a silver film negative by means of a 500-watt Leitz slide projector. The exposure time is 60 seconds. After development with water, a strong, red image of the master used is obtained on a colorless background.

EXAMPLE 18

A polyester film which had been provided with a layer of polyvinyl alcohol hardened with formaldehyde is coated, exposed and developed as described in Example 17. A film thus provided with an image was excellently suitable for the production of further copies on photocopying paper.

EXAMPLE 19

An eloxated aluminum support is coated, exposed and developed as described in Example 11. A printing plate prepared in this manner could be used for printing in an offset machine.

EXAMPLE 20

A 3% solution in acetone of "Alnovol 429 K" (a phenol aldehyde resin supplied by Chemische Werke Albert, Wiesbaden-Biebrich) is whirl-coated onto a support consisting of a copper-laminated plastic plate and dried. Subsequently, a solution of 0.2 g. of the condensation product from 2-methyl indole and benzaldehyde, 2 g. of N-vinyl carbazole, and 2 g. of tetrabromomethane in 10 ml. of acetone is applied by whirl-coating and dried.

The material is exposed for 60 seconds under a master to a 500-watt mixed light lamp at a distance of 35 cm. Development is effected with a 20% sodium metasilicate solution. After development, the copper in the unexposed areas is etched away by means of a 28% iron-III-chloride solution.

The above examples have been presented for the purpose of illustration and should not be taken to limit the scope of the present invention. It will be apparent that the described examples are capable of many variations and modifications. All such variations and modifications are to be included within the scope of the present invention as set forth in the appended claims.

What is claimed is:

1. Light-sensitive material comprising a light-sensitive composition and a suitable support therefor, said composition comprising:
(a) a condensation product of (1) an aldehyde and (2) an organic, nitrogen-containing heterocyclic azole,
(b) an N-vinyl carbazole, and
(c) a halogen hydrocarbon which splits off halogen when exposed to light.

2. Light-sensitive material according to claim 1, wherein said composition includes a binder material selected from the group consisting of natural and synthetic resins.

3. Light-sensitive material according to claim 1, wherein said composition includes a binder material selected from the group consisting of natural and synthetic resins having a substantial solubility in both an organic and an aqueous liquid.

4. Light-sensitive material according to claim 1, wherein said halogen hydrocarbon is selected from the group consisting of compounds having the general formula:

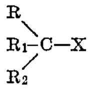

wherein:
(a) X represents chlorine, bromine, or iodine, and
(b) R, $R_1$ and $R_2$ are the same or different and represent chlorine, bromine, iodine, hydrogen, an alkyl, an aryl, an aralkyl, an alkenyl, or a heterocyclic group.

5. Light-sensitive material according to claim 1, wherein said azole is selected from the group consisting of:
(a) indoles of the general formula

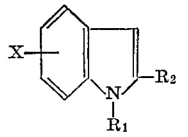

(b) pyrroles of the general formula

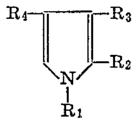

(c) pyrazoles of the general formula

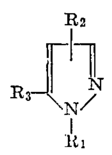

(d) imidazoles of the general formula

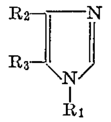

(e) pyrazolones of the general formula

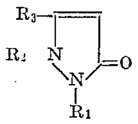

(f) triazoles of the general formula

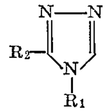

and
(g) tetrazoles of the general formula

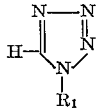

wherein
X represents OH, and O-alkyl, an halogen, a carboxyl, or a carboxyalkyl; and
$R_1$, $R_2$, and $R_3$, and $R_4$ are the same or are different and represent hydrogen, an alkyl, an alkenyl, an aralkyl, an alkaryl, or an aryl.

6. Light-sensitive material according to claim 1, wherein said halogen hydrocarbon is selected from the group consisting of:
tetrabromomethane,
4-nitro-ω,ω,ω-tribromoacetophenone,
4-bromo-ω,ω,ω-tribromoacetophenone,
2,4-dimethyl-ω,ω,ω-tribromoacetophenone, and
3-nitro-ω,ω,ω-tribromoacetophenone.

7. Light-sensitive material according to claim 1, wherein said composition includes a visible-light sensitizer selected from the group consisting of:
ferrocene,
diacetylferrocene,
dipropionylferrocene,
dibenzoylferrocene,
bis-(3-nitrobenzoyl)-ferrocene,
bis-(4-dimethylaminobenzoyl)-ferrocene, and
ferrocene-dicarboxylic acid.

8. Light-sensitive material according to claim 1, wherein said composition further includes an aldehyde selected from the group consisting of aromatic and heterocyclic aldehydes.

9. Light-sensitive material according to claim 1, wherein said composition comprises:
(a) the condensation product of the reaction between 1-methyl-2-phenyl indole and cinnamaldehyde,
(b) N-vinyl carbazole, and
(c) tetrabromo methane.

10. Light-sensitive material according to claim 1 wherein said composition comprises:
(a) the condensation product of the reaction between 2-methylindole and benzaldehydye,
(b) N-vinyl carbazole,
(c) tetrabromomethane, and
(d) ferrocene.

11. Light-sensitive material comprising a suitable support and a light-sensitive coating thereon, said coating consisting essentially of the dried residue of a homogeneous solution in a suitable solvent, said residue comprising:
(a) a condensation product of (1) an aldehyde and (2) an organic, nitrogen-containing, heterocyclic azole, (b) an N-vinyl carbazole, and (c) a halogen hydrocarbon which splits off halogen when exposed to light.

12. The method of making a permanent photocopy which comprises:

(a) image-wise exposing to light the light-sensitive material of claim 1;

(b) washing said material so exposed with a solvent for the halogen hydrocarbon compound.

13. The method of making a printing medium which comprises:

(a) image-wise exposing to light the light-sensitive material of claim 11; and (b) washing said material so exposed with a solvent selected from the group consisting of water and aqueous alkaline solutions, whereby the coated composition is washed from the support in the non-light-exposed areas.

14. The method of image-wise etching a plate which comprises:

(a) image-wise exposing to light the light-sensitive material of claim 11, wherein the support is a plate to be etched;

(b) washing said material so exposed with a solvent selected from the group consisting of water and aqueous alkaline solutions; and (c) contacting the surface of said material so washed with an aqueous composition having an etching effect on said plate.

References Cited

UNITED STATES PATENTS

| | | | |
|---|---|---|---|
| 3,046,125 | 7/1962 | Wainer | 96—90 |
| 3,056,673 | 10/1962 | Wainer | 96—48 |
| 3,164,467 | 1/1965 | Sprague et al. | 96—90 |
| 3,335,008 | 8/1967 | Dubosc | 96—49 |

NORMAN G. TORCHIN, Primary Examiner

R. E. FICHTER, Assistant Examiner

U.S. Cl. X.R.

96—90